United States Patent
Söchtig et al.

(10) Patent No.: US 8,113,486 B2
(45) Date of Patent: Feb. 14, 2012

(54) COMPONENT-FEED NOZZLE WITH PRESSURE RELIEF

(75) Inventors: Wolfgang Söchtig, Germering (DE); Elisabeth Karolina Söchtig, legal representative, Germering (DE); Melanie Söchtig, legal representative, Germering (DE); Stephanie Söchtig, legal representative, Germering (DE); Ernst Berchtenbreiter, Kissing (DE)

(73) Assignee: Krauss Maffei Technologies GmbH, München (DE)

( * ) Notice: Subject to any disclaimer, the term of this patent is extended or adjusted under 35 U.S.C. 154(b) by 560 days.

(21) Appl. No.: 12/326,444

(22) Filed: Dec. 2, 2008

(65) Prior Publication Data

US 2009/0134244 A1 May 28, 2009

Related U.S. Application Data

(63) Continuation of application No. PCT/EP2007/054443, filed on May 8, 2007.

(30) Foreign Application Priority Data

Jun. 8, 2006 (DE) .......................... 10 2006 026 609

(51) Int. Cl.
  *F16K 31/02* (2006.01)
(52) U.S. Cl. ...................... 251/282; 251/325; 366/182.4
(58) Field of Classification Search ................ 366/182.4; 239/283, 284; 251/282, 325
  See application file for complete search history.

(56) References Cited

U.S. PATENT DOCUMENTS

| | | | | |
|---|---|---|---|---|
| 62,721 | A * | 3/1867 | Lundorff | 251/325 |
| 1,080,273 | A * | 12/1913 | Fountain | 251/353 |
| 2,558,148 | A * | 6/1951 | Nicolls | 239/574 |
| 3,207,486 | A * | 9/1965 | Rosenthal | 366/138 |
| 3,873,063 | A * | 3/1975 | Illing | 251/282 |
| 5,788,932 | A * | 8/1998 | Proksa et al. | 422/133 |
| 5,875,922 | A | 3/1999 | Chastine et al. | |

FOREIGN PATENT DOCUMENTS

| | | |
|---|---|---|
| AT | 352 382 | 9/1979 |
| DE | 14 76 146 A1 | 7/1969 |
| DE | 35 22 618 A1 | 1/1987 |
| DE | 38 11 642 A1 | 10/1989 |
| DE | 39 13 681 C1 | 3/1990 |
| DE | 197 43 187 A1 | 6/1999 |

* cited by examiner

*Primary Examiner* — David Sorkin
(74) *Attorney, Agent, or Firm* — Henry M. Feiereisen; Ursula B. Day

(57) ABSTRACT

A component-feed nozzle for a reaction-mixing head of a reaction injection device includes a housing having a component inlet and a component outlet. Received in the housing is a closing and flow restriction member which is movable by a linear drive between at least two positions. In a first position, the closing and flow restriction member closes the component outlet, and in a second position clears the component outlet, thereby establishing a flow communication between the component inlet and the component outlet. The closing and flow restriction member has at least a first area and a second area, which generate forces in opposite directions, when the component pressure is applied, wherein the areas are sized in such a way that the opposing forces substantially offset one another.

8 Claims, 1 Drawing Sheet

COMPONENT-FEED NOZZLE WITH PRESSURE RELIEF

CROSS-REFERENCES TO RELATED APPLICATIONS

This application is a continuation of prior filed copending PCT International application no. PCT/EP2007/054443, filed May 8, 2007, which designated the United States and has been published but not in English as International Publication No. WO 2007/141106 and on which priority is claimed under 35 U.S.C. §120, and which claims the priority of German Patent Application, Serial No. 10 2006 026 609.9, filed Jun. 8, 2006, pursuant to 35 U.S.C. 119(a)-(d), the contents of which are incorporated herein by reference in its entirety as if fully set forth herein.

BACKGROUND OF THE INVENTION

The present invention relates to a component-feed nozzle for use in a reaction mixing head of a reaction injection device.

Nothing in the following discussion of the state of the art is to be construed as an admission of prior art.

A component-feed nozzle is used for introducing a reaction component into the mixing chamber of a mixing head and typically includes a housing with a component inlet as well as a component outlet. A closing member normally in the form of a nozzle needle moves back and forth to be able to close or clear the component inlet. When cleared, the component inlet is fluidly connected to the component outlet so that the component under pressure is made available to the component-feed nozzle and can be injected via the nozzle into the mixing chamber. The closing member is hereby exposed to significant stress by the component under pressure in a direction opposite to the closing direction. This reactive force must be overcome during movement, in particular when closing the component-feed nozzle. This, in turn, requires the presence of an adjustment drive to be sized generously, rendering manufacture and operation more costly.

It would therefore be desirable and advantageous to provide an improved component feed nozzle which obviates prior art shortcomings and which allows operation even with a small compact servomotor.

SUMMARY OF THE INVENTION

According to one aspect of the present invention, a component-feed nozzle for the use in a reaction mixing head of a reaction injection device includes a housing having a component inlet and a component outlet, a closing and flow restriction member arranged in the housing and defining a first area and a second area which are exposed to a substantially same component pressure, wherein the first area, when acted upon by the component pressure, produces a force in opening direction, and the second area, when acted upon by the component pressure, produces a force in closing direction, wherein the first and second areas are sized such that the force in opening direction and the force in closing direction substantially offset one another, and a linear drive operatively connected to the closing and flow restriction member for moving the closing and flow restriction member between a first position in which the component outlet is closed and a second position in which the component outlet is open, thereby forming a flow communication between the component inlet and the component outlet, wherein the closing and flow restriction member has a flow channel which fluidly connects the component inlet with an action space and terminates in an outlet channel to generate a force in the opening direction as a result of the component pressure.

The closing and flow restrictor member can be configured for full closing of the component-feed nozzle as well as opening at a preferably variably adjustable degree of flow restriction. In a simple configuration, the closing and flow restrictor member can be moved into only two positions. Currently preferred is however a movement, especially continuous movement, of the closing and flow restrictor member into many positions.

The closing and flow restrictor member may include a body having the shape of a piston. A flow channel may hereby be provided in the piston-like body to establish a flow communication between the component inlet and an action space. The action space is partly demarcated by the closing and flow restriction member, with this boundary representing the second area. In opposition to this action space, on the inlet side is a further action space in which the first area or first areas are arranged.

According to another feature of the present invention, the linear drive may be implemented as an electric linear drive.

According to another feature of the present invention, the closing and flow restrictor member may be made of one part or multiple parts.

A component-feed nozzle according to the present invention is very versatile in use and can be suited to the application at hand. If at all, the component-feed nozzle according to the present invention is at most subjected to only a negligible resultant force, when the closing and flow restrictor member is exposed to the component pressure, so that a movement of the closing and flow restriction member is not opposed by a significant reactive force. As a result, the linear drive for moving the closing and flow restriction member does not need to overcome reactive forces or needs to overcome only negligible reactive forces because the forces exerted by the component pressure substantially offset one another when summed up. There is only a need for the linear drive to overcome a friction force that is inherent to the system so that a significantly more compact servomotor can be used. As a result, the drive can be reduced in size by up to 90%.

As stated above, the opposing forces applied upon the first and second areas as a consequence of the component pressure exactly compensate each other. There may, however, be situations, when the forces in particular positions—for example in the closing position—do not fully offset one another and a resultant small force may remain in opening and closing directions. This however is negligible.

The first and second areas can be distributed across the entire closing and flow restrictor member and may also be composed of partial areas.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
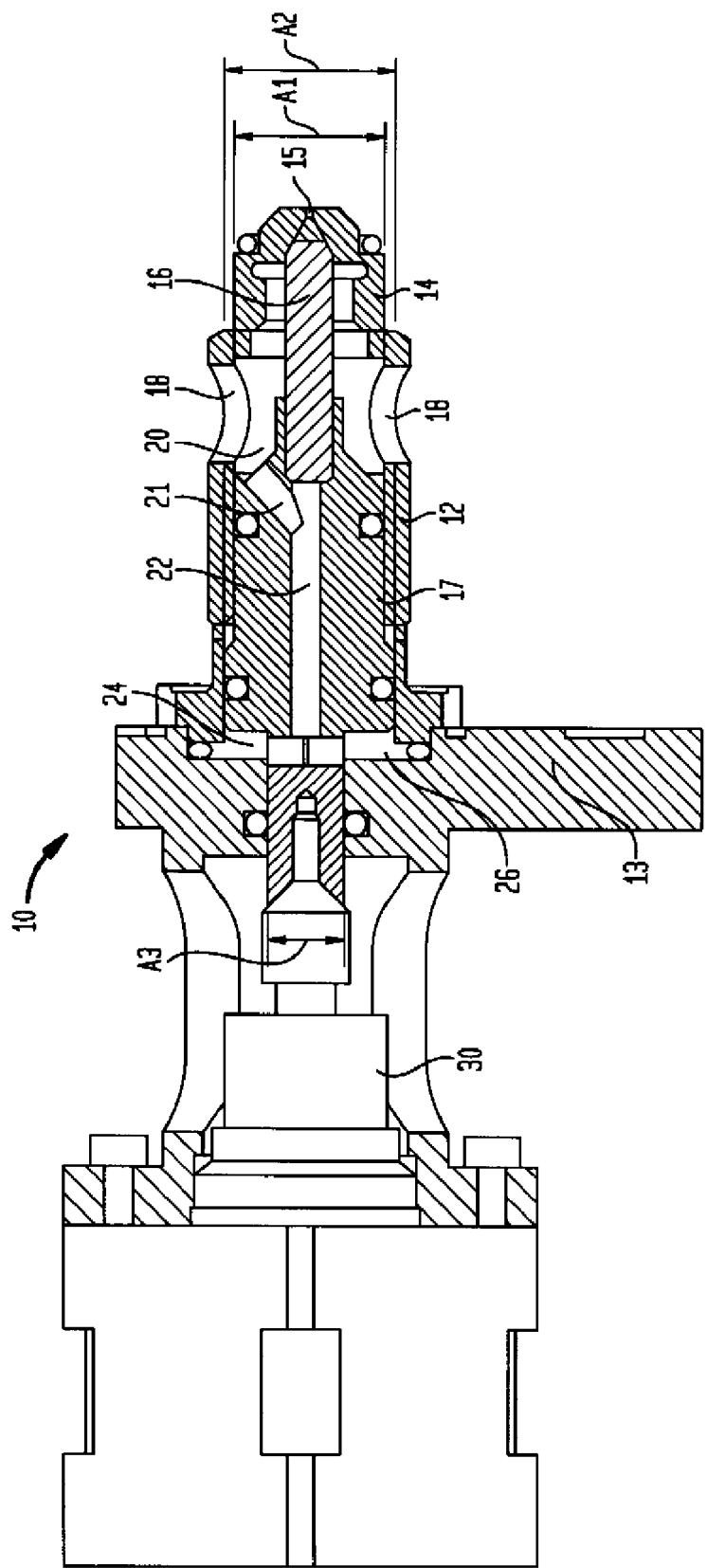
FIG. 1 is a partly sectional illustration of a component-feed nozzle according to the invention in closed position.

The depicted embodiment is to be understood as illustrative of the invention and not as limiting in any way. It should also be understood that the FIGURE is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a partly sectional illustration of a component-feed nozzle according to the invention, generally designated by reference numeral 10 and including a housing with a first front housing part 12 and a second rear housing part 13. The front housing part 12 is configured for receiving a closing and flow restrictor member comprised of a nozzle needle 16 and a needle body 17. A linear drive 30 is received in the rear housing part 13. The needle body 17 of the closing and flow restrictor member projects slightly into the second housing part 13 and is connected there with the linear drive 30. The closing and flow restrictor member, i.e. the needle body 17 and the nozzle needle 16, are moved forward and backwards by the linear drive 30. The component-feed nozzle 10 is closed, when the nozzle needle 16 has moved forward. This is shown in FIG. 1. When withdrawn from the closing position and thus detached from the seat, the closing and flow restrictor member is open, with the degree of opening being determinative for the flow restriction effect.

The piston-shaped needle body 17 fills the rear zone of the first housing part 12 in a substantial cylindrical manner and is able to move back and forth within a certain range, defined by various stops. The nozzle needle 16 is fitted in the forward zone of the needle body 17 and can be moved linearly together with the needle body 17.

The first front housing part 12 includes a leading nozzle tip 14 in which a nozzle orifice 15 as component outlet is arranged.

A component inlet 18 in the form of inlet ports 18 is further arranged on the side of the leading first housing part 12 and extends about the outer circumference for allowing supply of a reaction component of the component-feed nozzle 10. This reaction component flows via the component inlet 18 into a component chamber 20 which extends between the needle body 17 and the nozzle orifice 15. Further provided in the needle body 17 is an inlet channel 21 as well as a central transfer channel 22 and an outlet channel 24 which together define a flow communication between the component chamber 20 and an action space 26, with the action space 26 having a ring-shaped configuration between the needle body 17 and the second rear housing part 13. The action space 26 is shaped in the form of a ring because the outlet channel 24 is merely configured in the form of a bore through the central part of the body 17.

In the closed position of the component-feed nozzle 10, as shown in FIG. 1, the nozzle needle 16 has been completely moved forwards by the drive 30 so as to close the nozzle orifice 15. As a consequence, there is no flow communication between the component inlet 18 and the component outlet 15. The nozzle is entirely closed. When the nozzle needle 16 is retracted by the drive 30 in another operating position (not shown), the component outlet 15 is cleared and a flow communication, depending on the degree of retraction, is established between the component inlet 18 and the component outlet 15. In this operative position, material introduced into the component-feed nozzle 10 via the component inlet 18 can be transferred to the component chamber 20 and ultimately via the component outlet 15 into an unillustrated mixing head in correspondence with the nozzle orifice. Examples of a mixing head in which a component-feed nozzle 10 according to the invention can be incorporated are described in German Offenlegungsschrift DE 35 22 618 A1 or DE 197 43 187 to which reference is made herewith. Accordingly, the mixing head includes a control and cleaning piston which is able to move back and forth in a (not shown) mixing chamber and has one or more recirculation grooves.

In each operating state, forces, which are defined by the respective areas of attack, act hereby on the closing and flow restriction member, in particular the needle body 17. One area of attack is established on the rear region of the needle body 17, defined by the ring-shaped action space 26, and designated with A2. The force generated by the component pressure applied on this area A2 points in closing direction. A further area is established in the forward zone of the needle body 17 and is designated with A1. The force generated by the component pressure applied on this area A2 points in opening direction. In addition, there is an area, designated with A3 and defined by the upper area of the outlet channel 24. The force generated by the component pressure applied on this area A3 points also in opening direction.

In accordance with the invention, the area A2 should be sized identical to the sum of the areas A1 and A3. In this case, the forces, generated by the component pressure upon the areas A1, A2, A3, substantially offset one another, when summed up so that a movement by the closing and flow restrictor member is not opposed by reactive forces caused by the component under pressure. It should be noted in this context that the component pressure upon the effective areas is substantially the same.

As can be seen in FIG. 1, the force conditions may slightly change in the closing state. In the closing state, the forward tip of the needle 16 rests against the seat of the nozzle orifice 15 so that the component pressure does no longer act on this area. Thus, the pressure in opening direction is in this switching position smaller by the resultant force magnitude. As a result, a certain small reactive force must be overcome during opening. However, the component-feed nozzle assumes therefore a stable position in the closing position, without requiring to maintain the drive in continuous operation so that the resultant force keeps the component-feed nozzle closed.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A component-feed nozzle for the use in a reaction mixing head of a reaction injection device, comprising:
   a housing having a component inlet and a component outlet;
   a closing and flow restriction member arranged in the housing and defining a first area and a second area which are exposed to a substantially same component pressure, wherein the first area, when acted upon by the component pressure, produces a force in opening direction, and the second area, when acted upon by the component pressure, produces a force in closing direction, wherein the first and second areas are sized such that the force in opening direction and the force in closing direction substantially offset one another; and an electric linear drive operatively connected to the closing and flow restriction member for moving the closing and flow restriction member between a first position in which the component outlet is closed and a second position in which the component outlet is open, thereby forming a flow communication between the component inlet and the component outlet, wherein the closing and flow restriction member has a flow channel which fluidly connects the component inlet with an action space and terminates in an outlet channel to generate a force in the opening direction as a result of the component pressure.

2. The component-feed nozzle of claim 1, wherein the closing and flow restriction member is movable by the electric linear drive between a multiplicity of positions.

3. The component-feed nozzle of claim 1, wherein the closing and flow restriction member is continuously adjustable.

4. The component-feed nozzle of claim 1, wherein the closing and flow restriction member has a piston-shaped configuration and includes a nozzle body having a forward zone, and a nozzle needle received in the forward zone of the nozzle body.

5. The component-feed nozzle of claim 4, wherein the nozzle body and the nozzle needle are constructed in the form of a single-piece configuration.

6. The component-feed nozzle of claim 1, wherein at least one of the first and second areas is composed of spaced-apart partial areas.

7. The component-feed nozzle of claim 1, wherein the housing is configured with a front housing part and a rear housing part, said closing and flow restriction member being received in the front housing part, and the electric linear drive being received in the rear housing part.

8. The component-feed nozzle of claim 7, wherein the action space has a ring-shaped configuration between the needle body and the rear housing part.

* * * * *